US006312794B1

(12) United States Patent
Sekiguchi et al.

(10) Patent No.: US 6,312,794 B1
(45) Date of Patent: Nov. 6, 2001

(54) INK JET RECORDING SHEET

(75) Inventors: Hideki Sekiguchi; Takao Senga, both of Tokyo (JP)

(73) Assignee: Mitsubishi Paper Mills Limited, Tokyo (JP)

( * ) Notice: Subject to any disclaimer, the term of this patent is extended or adjusted under 35 U.S.C. 154(b) by 0 days.

(21) Appl. No.: 09/276,501

(22) Filed: Mar. 25, 1999

(30) Foreign Application Priority Data

Mar. 31, 1998 (JP) ................................................ 10-087430
Jan. 27, 1999 (JP) ................................................ 11-018507

(51) Int. Cl.[7] ........................................................ B32B 9/00
(52) U.S. Cl. ...................... 428/318.4; 428/195; 428/211; 428/331
(58) Field of Search .................................... 428/211, 331, 428/195, 220, 304.4, 219, 318.4, 315.5, 315.7, 340, 341, 342, 446, 537.6

(56) References Cited

U.S. PATENT DOCUMENTS 4,780,356 * 10/1988 Otouma et al. ...................... 428/212
4,915,923 4/1990 Ogawa et al. ...................... 423/335
5,496,634 * 3/1996 Ogawa et al. ...................... 428/341

FOREIGN PATENT DOCUMENTS 0 765 764 4/1997 (EP) .

OTHER PUBLICATIONS

Patent Abstracts of Japan, vol. 013, No. 340, Jul. 31, 1989, JP 01–115677, May 8, 1989.

* cited by examiner

*Primary Examiner*—Bruce H. Hess
*Assistant Examiner*—B. Shewareged
(74) *Attorney, Agent, or Firm*—Oblon, Spivak, McClelland, Maier & Neustadt, P.C.

(57) ABSTRACT

An ink jet recording sheet having an ink receiving layer containing synthetic amorphous silica formed on at least one side of a support, wherein the pore volume (V1:ml/g) of pores with pore sizes of from 110 to 200 Å and the pore volume (V2:ml/g) of pores with pore sizes of from 10 to 300 Å in the synthetic amorphous silica satisfy the following mathematical formulae 1 and 2.

$$V1 \leqq 0.5 \text{ (ml/g)} \qquad 1$$

$$V2 \geqq 0.8 \text{ (ml/g)} \qquad 2$$

8 Claims, 2 Drawing Sheets

INK JET RECORDING SHEET

The present invention relates to an ink jet recording sheet, particularly to a high-quality ink jet recording sheet improved against yellowing under a blank state and excellent in ink absorptivity.

The ink jet recording system is a system which jets and deposits fine droplets of ink on a recording sheet such as a paper sheet on various operational principles representatively by the deflection method, the cavity method, the thermo-jet method, the bubble jet method, the thermal ink jet method, the slit jet method or the spark jet method to record images or letters. By virtue of its merits such as high speed, low noise, easiness of multicolor recording, flexibility in recording patterns and exemption from development-fixation, it has been rapidly finding versatile applications in recording apparatus for various patterns including Chinese characters and for color images.

Further, images recorded by the ink jet recording system with color inks containing coloring materials of yellow, magenta, cyan and black in solvents such as water and hydrophilic solvents can be comparable to those obtained by multicolor printing involving platemaking. Further, for the purpose of making a small number of copies, the ink jet recording system has been applied widely even in the field of full color image recording, because the ink jet recording system costs less than development of silver salt photographs.

The recent technological developments has broadened the applications of the ink jet recording system, and its applications, even only in output of hard copies, are roughly classified into three: (1) for common use (for home use and for hobby use), (2) for OA (for office use) and (3) for industrial use (for EA and for FA). Especially for industrial use, the ink jet recording system has been spreading due to demand for highly fine hard copies of at least 400 dpi (16 dots/mm).

In particular, highly fine hard copies obtainable by ink jet recording are a potent substitute for silver salt photographs, and storage stability is an important characteristic requisite for ink jet recording sheets not to speak of color reproducibility and gradation of images. The storage stability of ink jet recording sheets generally refers to fading, discoloration and blurring of printed images (storage stability of printed images) and to discoloration and foxing of blank sheets (storage stability under a blank state).

With respect to storage stability of images, it is known that change from conventional water-soluble dyes to such fast pigments as proposed in JP-A-57-10660, JP-A-57-106601, JP-A-4-234467, JP-A-5-156189, JP-A-5-179183, JP -A-5-202324, JP-A-5-263029, JP-A-5-331397, JP-A-6-122846 and JP-A-6-136311 improves light resistance, water resistance and ozone resistance drastically.

Besides, change to oil-soluble dyes such as naphtol dyes, azo dyes, metal complex salt dyes, anthraquinone dyes, quinoimine dyes, indigo dyes, cyanine dyes, quinoline dyes, nitro dyes, nitroso dyes, benzoquinone dyes, carbonium dyes, naphthoquinone dyes, naphthalimide dyes, phthalocyanine dyes and perinine dyes proposed, for example, in JP-B-7-78187, JP-B-7-78188, JP-B-8-6057, JP -B-8-26259, JP-B-6-247034 and JP-B-6-306319 enables production of ink jet recording sheets with high image density excellent in color development as well as in water resistance and cockling resistance.

As discussed above, the recognition of the importance of comprehensive research for improvement of not only ink jet recording sheets but also ink to storage stability of printed images has actually brought great improvement.

On the other hand, with respect to storage stability under a blank state, improvement against yellowing is the main subject to investigate. Yellowing under a blank state is not only attributable to light, ozone, $NO_x$, heat and moisture but also can be caused by certain kinds of anti-oxidants. Especially, the latter case is known to happen when highly fine hard copies are kept in a file or adhesive tape is attached to the surface of the ink receiving layer. This problem is of great importance to the ink jet recording system as a substitute for silver salt photography, and no satisfactory ink jet recording sheets are available yet in spite of various studies for improvement.

Ink jet recording sheets have to meet various requirements such as high printed dot density, a bright and vivid color tone, ink absorption swift enough to prevent the ink from running or blurring even from overlapping printed dots, avoidance of unnecessarily wide spread printed dots, ink dots with smooth peripheries which are almost completely circular in shape and are not blurred, and high brightness. Application or incorporation of synthetic amorphous silica and/or its salt to a paper surface optionally together with a binder resin as disclosed in JP-A-57-157786, incorporation of hydrated porous cationic aluminum oxide as disclosed in JP-A-60-232990, and incorporation of synthetic amorphous silica having a large BET specific surface area or hydrated cationic aluminum oxide which is cationic colloidal particles as disclosed in JP-A-60-204390 and JP-A-2-198889 work to this end.

However, these ink jet recording sheets are liable to yellowing under a blank state, and simple use of synthetic amorphous silica having a large specific surface area in pursuit of image density or color development intensified yellowing very noticeably.

Accordingly, the object of the present invention is to provide a high-quality ink jet recording sheet improved against yellowing under a blank state which can happen when highly fine hard copies obtained by ink jet recording are kept in a file or adhesive tape is attached to the surface of the ink receiving layer, and having an excellent ink absorptivity.

As a result of extensive research on the problem, the present inventors speculated that yellowing under a blank state which can happen when highly fine hard copies obtained by ink jet recording are kept in a file or when adhesive tape is attached to the surface of the ink receiving layer was attributable to phenolic anti-oxidants in the file or the adhesive tape represented by 2,6-di-tert-butyl-4-methylphenol (hereinafter referred to as BHT).

Typical examples of these phenolic anti-oxidants are BHT (Sumilizer BHT: Sumitomo Chemical Company, Ltd., Yoshinox BHT: Yoshitomi Fine Chemicals, Ltd., Antage BHT: Kawaguchi Chemical Industry Co., Ltd.), n-octadecyl 3-(3', 5'-di-tert-butyl-4'-hydroxyphenyl)propionate (Irganox 1076: Ciba- Geigy, ADEKASTABU AO-50: ASAHI DENKA KOGYO K.K., Sumilizer BP-76: Sumitomo Chemical Company, Ltd., Tominox SS: Yoshitomi Fine Chemicals, Ltd.), 4,4'-butylidenebis-(3-methyl-6-t-butylphenol) (ADEKASTABU AO -40: ASAHI DENKA KOGYO K.K., Sumilizer BBM-S: Sumitomo Chemical Company, Ltd., Yoshinox BB: Yoshitomi Fine Chemicals, Ltd., Antage W300: Kawaguchi Chemical Industry Co., Ltd., Noclizer NS30: Ouchi Shinko Chemical Industrial Co., Ltd., Nonflex BB: Seiko Chemical Co., Ltd.), tetrakis [methylene-3-(3',5'-di-tert-butyl-4-hydroxyphenyl) propionate]methane (Irganox 1010: Ciba-Geigy, ADEKASTABU AO-60: ASAHI DENKA KOGYO K.K., Sumilizer BP101: Sumitomo Chemical Company, Ltd., Tominox TT: Yoshitomi Fine Chemicals, Ltd., TTHP: Toray Industries, Inc.), 2,2'-methylenebis(4-methyl-6-t-butylphenol) (Sumilizer MDP-S: Sumitomo Chemical Company, Ltd., Yoshinox 2246R: Yoshitomi Fine Chemicals, Ltd., Antage W400: Kawaguchi Chemical Industry Co., Ltd., Nocrac NS-6: Ouchi Shinko Chemical Industrial Co., Ltd., Nonflex MBP: Seiko Chemical Co., Ltd.), 4,4'-thiobis(3-methyl-6-t-butylphenol) (Sumilizer WX-R: Sumitomo Chemical Company, Ltd., Yoshinox SR: Yoshitomi Fine Chemicals, Ltd., Antage crystal: Kawaguchi Chemical Industry Co., Ltd., Noclizer 300: Ouchi Shinko Chemical Industrial Co., Ltd., Nonflex BPS-R: Seiko Chemical Co., Ltd.), tris(3,5-di-tert-butyl-4-hydroxybenzyl) isocyanurate (Irganox 3114: Ciba-Geigy, ADEKASTABU AO-20: ASAHI DENKA KOGYO K.K.), and triethylene glycol bis[3-(3-t-butyl-4-hydroxy-5-methylphenyl) pronionate] (Irganox 245: Ciba-Geigy, ADEKASTABU AO-70: ASAHI DENKA KOGYO K.K., Tominox 917: Yoshitomi Fine Chemicals, Ltd.).

Yellowing due to BHT has been reported in Polymer Degradation and Stability 50 (1995) 313–317, Textil Praxis International Oktober (1980) 1213–1215, Textil Praxis International Marz (1983) 261–264, Textile Chemist and Colorist April (1983) Vol.15, No.4, 52–56 and Text. Progr. 15 (1987) 16, and has been addressed and studied as a problem for some time in the textile and clothing industries, and it has been found out that BHT converts into a compound having a stilbenequinone structure through oxidation.

It can be presumed that yellowing of an ink jet recording sheet kept in a clear file containing BHT under a blank state is attributable to migration of BHT from the clear file to the ink receiving layer of the recording sheet. Accordingly, it is assumed that yellowing of an ink jet recording sheet sets in on contact with ordinary goods containing a phenolic anti-oxidant represented by BHT and is promoted by secondary factors such as temperature and humidity.

Interestingly, JP-A-1-222987 proposes a spot test using [4,4'-methylenebis(2,6-(di-tert-butylphenol))] (hereinafter referred to as BHT2) to evaluate the catalytic activity of a porous ink receiving layer on decomposition of the dye in ink by oxygen. In the BHT2 spot test, BHT reproducibly turns yellow as it oxidizes to form a stilbenequinone structure, and thus, the results of the test have been associated with indoor discoloration of images printed on ink jet recording media.

Further, though according to the proposal, a recording surface or an ink receiving layer containing a silicon-containing pigment containing at least 0.1 wt % of a metal selected from the group consisting of Mg, Ca, Zn and Ba is supposed to be preferable as a style of coating layer or ink receiving layer for being less liable to yellowing in the BHT2 spot test, decrease in image density is reported as an accompanying side effect. Combined use of a cationic substance is proposed to lessen the side effect, but it is reported to lower light resistance in turn. Thus, the problem with storage stability of ink jet recording sheets has been known to be related to phenolic anti-oxidants represented by BHT so far.

The degree of yellowing of BHT which has migrated to an ink receiving layer depends on the constituents and the structure of the ink receiving layer, particularly on the pigment constituting the ink receiving layer, as is evident from the above-mentioned proposal.

After their extensive research, the present inventors reached a conclusion that in order to obtain an ink jet recording sheet which is free from yellowing under a blank state attributable to BHT and excellent in image density and color development, use of a specific synthetic amorphous silica which has a pore size distribution specified within a certain range unlike the pigment proposed above, is a particularly preferable mode. As the yellowing of BHT seems to be promoted by a porous pigment having an active site, and the pore sizes affect the yellowing rate of BHT, it has been found that the yellowing can be suppressed with a pigment having specific pore sizes.

Namely, the present invention provides an ink jet recording sheet having an ink receiving layer containing synthetic amorphous silica formed on at least one side of a support, wherein the pore volume (V1:ml/g) of pores with pore sizes of from 110 to 200 Å and the pore volume (V2:ml/g) of pores with pore sizes of from 10 to 300 Å in the synthetic amorphous silica satisfy the following mathematical formulae 1 and 2.

$$V1 \leqq 0.5 \text{ (ml/g)} \quad 1$$

$$V2 \geqq 0.8 \text{ (ml/g)} \quad 2$$

Further, when the surface pH of the ink receiving layer defined in TAPPI T529 is at most 6.0, a better result can be obtained.

A simple means of making the surface pH of the ink receiving layer at most 6.0 is to use an acidic base paper obtained by sheeting a slurry containing natural pulp as a main component, as the support of the ink jet recording sheet.

As the support of the ink jet recording sheet, a pseudo acidic base paper obtained by coating a neutral paper obtained by sheeting a slurry containing natural pulp as a main component, with an aluminum sulfate solution may also be used.

The effect is greater, when the coating amount of the ink receiving layer is within a range of from 1 to 7 g/m$^2$.

Formation of an ink receiving layer on each side of the support by an on machine coater leads to a preferable result. Further, when the coater adopts a film transfer method, a more preferable result can be obtained.

Figure 1:
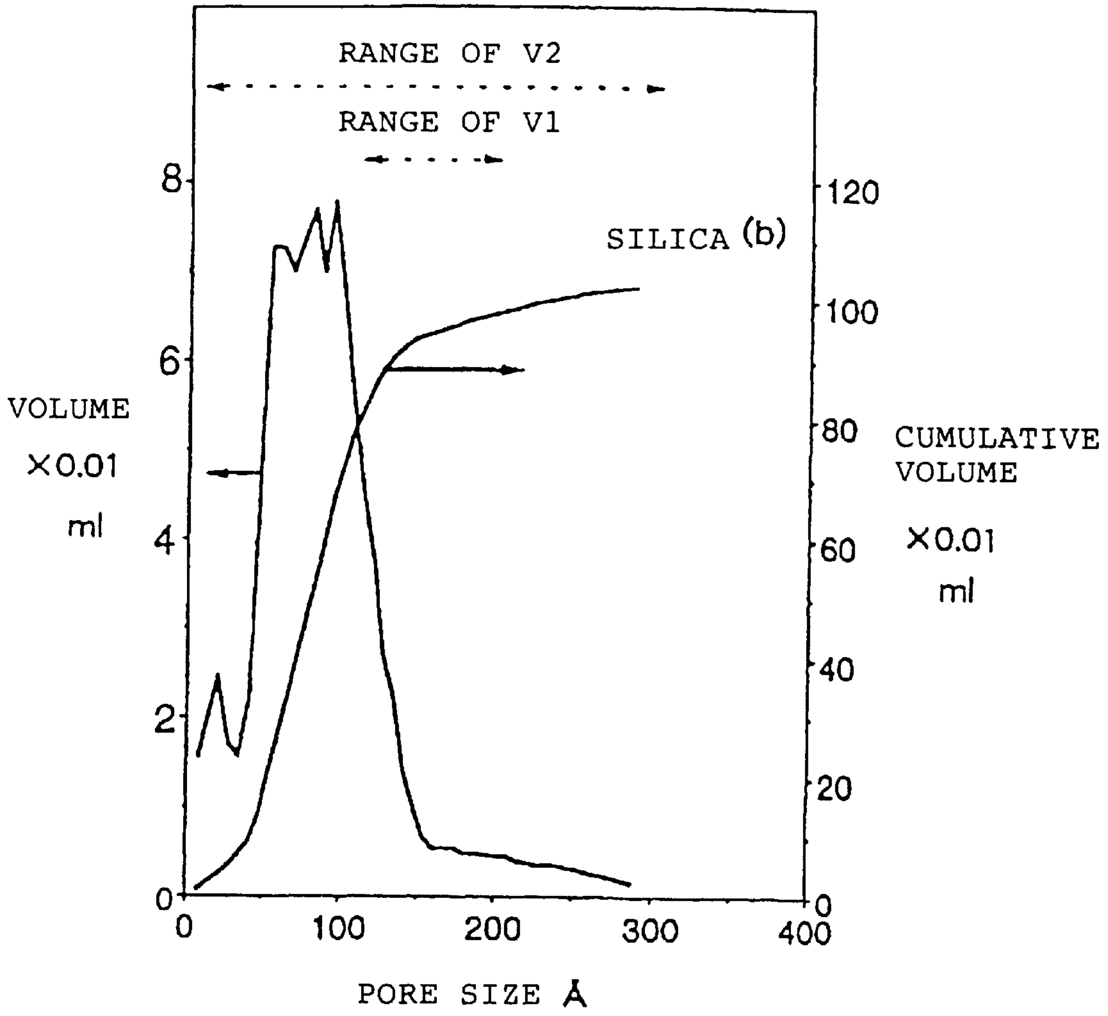
FIG. 1 illustrates the pore size distribution of synthetic amorphous silica (b) used for the ink jet recording sheet of the present invention.

Now, the present invention will be described in detail.

The ink receiving layer of the ink jet recording sheet of the present invention contains synthetic amorphous silica having a pore volume larger than a specific value and specific pore sizes. Regarding ink jet recording sheets, a number of proposals to provide an ink receiving layer containing synthetic amorphous silica as the main component on the support have been made so far for the purpose of swift ink absorption and excellent image density and color development, or improvement of various kinds of storability.

For example, 1) synthetic silica and/or its salt is used (JP-A-55-51583 and JP-A-57-1577886),
2) synthetic silica having an average particle diameter of from 2.5 to 3.5 $\mu$m and a specific particle size distribution wherein pores within a range of from 60 to 130 Å constitutes at least 20% of all the pores is used (JP-A-61-141584),
3) synthetic amorphous silica which gives a 4 wt % aqueous suspension having a pH of from 9 to 12 and an electrical conductivity of from 400 to 1,000 micro mho/cm and having such chemical composition that the Ni/SiO$_2$ ratio is from 0.02 to 0.04 is used (JP-A-61-230979), 4) amorphous silica having a median diameter of from 2 to 15 μm measured by a coulter counter method, an oil absorption of 180 ml/100 g and a refractive index of at least 1.450 measured by a solvent method and a moisture absorption of at least 35% when allowed to absorb moisture at a relative humidity of 90% and 25° C. for 200 hours is used (JP-A-62-292476), 5) coated silica particles obtained by coating the surfaces of amorphous silica particles having a median diameter of from 2 to 15 μm measured by a coulter counter method, an oil absorption of 180 ml/100 g and a refractive index of at least 1.450 measured by a solvent method and a moisture absorption of at least 35% when allowed to absorb moisture at a relative humidity of 90% and 25° C. for 200 hours, with from 0.5 to 20 wt %, on an oxide basis, of a compound of a metal of Group II in the periodic table is used (JP-A-63-306074), 6) fine silica having a specific surface area of at least 200 $m^2/g$ measured by a BET method and a uniformity coefficient n of at least 1.10 according to the Rosin-Rammler distribution on a base paper having a Stockigt sizing degree of at most 4 sec based on a basis weight of 60 $g/m^2$ is used (JP-B-3-26665), and 7) alkali-added amorphous silica which has a BET specific surface area of at least 200 $m^2/g$, an oil absorption of at least 180 ml/100 g and is brought to an acid strength ($H_o$) of +4.8 by at most 0.1 mmol/g of an acid is used (JP-A-5-64953).

However, those kinds of synthetic amorphous silica under the above-mentioned proposals are not aimed at preventing yellowing of a blank sheet which is kept in a file or has adhesive tape on the ink receiving layer and can not suppress yellowing. On the contrary, some kinds of synthetic amorphous silica can make yellowing more terrible.

The synthetic amorphous silica used for the ink jet recording sheet of the present invention is such that the pore volume V1 of pores with pore sizes of from 110 to 200 Å is at most 0.5 ml/g, preferably from 0 to 0.4 ml/g, and the pore volume V2 of pores with pore sizes of from 10 to 300 Å is at least 0.8 ml/g, preferably at least 1.0 ml/g, as shown in FIG. 1. If V1 exceeds 0.5 ml/g, suppression of yellowing under a blank state is difficult. Yellowing of phenolic antioxidants such as BHT incorporated into clear files and the like after migration to an ink jet recording sheet by vaporization or by contact is influenced by the pore sizes of the primary particles of synthetic silica. Synthetic amorphous silica having a lot of pores with pore sizes of from 110 to 200 Å leads to terrible yellowing, and the phenomenon of development of a deep yellow is observed especially in the vicinity of the opening of a file, which is likely to be exposed to air. Therefore, it is preferred that V1 is as small as possible.

On the other hand, if V2 is below 0.8 ml/g, the ink absorptivity is poor, and certain types of ink jet printers and plotters can not provide highly fine images due to brimming of the ink. The upper limit of V2 is not particularly set, but it is generally from 3.5 to 4.0 ml/g. In general, V2 is preferred to be large for an ink jet recording sheet because the ink absorptivity improves as V2 increases, but simple and efficient production of an ink jet recording sheet is difficult due to problems of thickening of a coating solution for an ink receiving layer under preparation and decrease in the strength of an ink receiving layer.

For the ink receiving layer of the jet recording sheet, synthetic amorphous silica which has the above-mentioned pore volumes and pore sizes and is even in pore sizes, namely has a narrow pore size distribution is especially preferable.

The pore size distribution preferably has a peak pore size outside the range of from 110 to 200 Å, particularly within the range of from 220 to 250 Å or from 40 to 100 Å. Of course, two or more kinds of silica, for example, synthetic amorphous silica having a peak pore size from 220 to 250 Å and synthetic amorphous silica having a peak pore size from 40 to 100 Å, may be used in combination, and even silica having too many pores with pore sizes of from 110 to 200 A can be used in mixture so long as the mixture satisfies the mathematical formulae 1 and 2, though the silica can not be used alone as synthetic amorphous silica in the present invention.

The synthetic amorphous silica used for the ink jet recording sheet of the present invention is prepared by any methods such as an electric arc method, a plasma method, a flame hydrolysis method, a dry method and a wet method (a precipitation method and a gelation method), but preferably by a wet method (a precipitation method and a gelation method), which can provide synthetic amorphous silica appropriately optimized to the above-mentioned pore volumes and pore size distribution without difficulty. When synthetic amorphous silica is prepared by a wet method, the pore volume and pore size distribution are controlled appropriately by factors such as the $Na_2O$ concentration, $SiO_2$ concentration, neutralization rate and reaction temperature at the time of the reaction between sodium silicate and sulfuric acid.

With respect to other properties, the synthetic amorphous silica used for the ink jet recording sheet of the present invention preferably has a specific surface area of at least 20 $m^2/g$, preferably from 50 to 400 $m^2/g$, measured by a BET method, an oil absorption of at least 0.3 ml/g, preferably at least 1.0 ml/g, an average particle diameter of about from 0.1 to 30 μm and a brightness by Hunter of at least 90.

One or more conventionally known pigments may be incorporated in the ink receiving layer of the ink jet recording sheet of the present invention so long as the object of the present invention is not defeated.

Pigments are roughly classified as inorganic or organic, and as inorganic pigments, white pigments such as light calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, aluminum hydroxide, alumina, lithopone, zeolite, hydrolyzed halloysite, magnesium carbonate and magnesium hydroxide may be mentioned.

On the other hand, as organic pigments, white or colorless polymer beads are preferably used. For example, completely spherical or amorphous, non-porous or porous beads of at least one resin such as an acrylic or methacrylic resin, a vinyl chloride resin, a vinyl acetate resin, a polyester resin, a styrene/acryl resin, a styrene/butadiene resin, a polystyrene/acryl resin, a polystyrene/isoprene resin, a methyl methacrylate/butyl methacrylate resin, a polycarbonate resin, a silicone resin, a urea resin, a melamine resin, an epoxy resin, a phenolic resin and a diallyl phthalate resin may be mentioned.

Further, the ink receiving layer of the ink jet recording sheet of the present invention may contain colloidal particles so long as the object of the present invention is not defeated. Colloidal particles means particles which form a colloid when dispersed in water, and for example, pseudo boehmite sols disclosed in JP-A-1-97678, JP-A-2-275510, JP-A-3-281383, JP-A-3-285814, JP -A-3-285815, JP-A-4-92183, JP-A-4-267180 and JP-A-4-275917, colloidal silica disclosed in JP-A-60-21908, JP-A-61-19389, JP-A-61-188183, JP-A-63-178074 and JP-A-5-51470, silica/alumina hybrid sols disclosed in JP-B-4-19037 and JP-A-62-286787, as well as smectite clay such as hectorite and montmorillonite (JP-A-7-81210), a zirconia sol, a chromia sol, a yttria sol, an iron oxide sol, a zircon sol, an antimony oxide sol may be mentioned as representatives.

The ink receiving layer of the ink jet recording sheet of the present invention may contain a binder resin for the purpose of improving the adhesion among synthetic amorphous silica and between the ink receiving layer and the support. As the binder resin, at least one of polyvinyl alcohol (abbreviated as PVA), silanol-modified polyvinyl alcohol, polyvinyl acetate, oxidized starch, etherified starch, cellulose derivatives such as carboxymethyl cellulose and hydroxyethyl cellulose, casein, gelatin, soybean protein, silyl-modified polyvinyl alcohol; conjugated diene copolymer latexes such as a maleic anhydride resin, a styrene-butadiene copolymer and a methyl methacrylate-butadiene copolymer; acrylic polymer latexes such as an acrylate or methacrylate polymer or copolymer and an acrylic or methacrylic polymer or copolymer; vinyl polymer latexes such as an ethylene-vinyl acetate copolymer; functional group-modified polymer latexes derived from these various polymers by modification with a monomer containing a functional group such as a carboxyl group; aqueous adhesives such as those based on thermosetting synthetic resins such as a melamine resin and a urea resin; and adhesives based on synthetic resins such as a polymethyl methacrylate, a polyurethane resin, an unsaturated polyester resin, a vinyl chloride-vinyl acetate copolymer, a polyvinyl butyral and alkyd resin, may be used alone or in combination. Other known natural or synthetic resin binders may be used alone or in combination without any restriction.

The amount of a binder is from 3 to 70 parts by weight, preferably from 5 to 50 parts by weight based on 100 parts by solid weight of synthetic amorphous silica. If the amount is less than 3 parts by weight, the strength of the ink receiving layer is insufficient, and incorporation of more than 70 parts by weight of a binder is not preferable because some types of ink jet recording apparatuses may cause brimming of the ink due to poor ink absorptivity.

Further, as other additives, a cationic dye-fixing agent, a pigment dispersant, a thickener, a fluidity-improving agent, a deforming agent, a foam-suppressing agent, a release agent, a blowing agent, a penetrating agent, a coloring dye, a coloring pigment, a fluorescent brightener, an ultraviolet absorber, a preservative, an ash-preventing agent, a waterproofing agent, a wet-strength agent, a dry-strength agent, an anti-oxidant and the like may be added appropriately.

When the surface pH of the ink receiving layer of the ink jet recording sheet of the present invention defined in TAPPI T529 is at most 6.0, yellowing under a blank state is suppressed further, because in addition to the action of the specific synthetic amorphous silica used in the present invention, yellowing of phenolic anti-oxidants represented by BHT is suppressed in the acidic pH range. Therefore, it is preferable to use an acidic substance such as hydrochloric acid, nitric acid, sulfuric acid and acetic acid to lower the pH of the ink receiving layer.

As the support of the ink jet recording sheet of the present invention, for example, a) base papers produced by various machines such as a Fourdrinier paper machine, a cylinder paper machine and a twin wire paper machine from a slurry obtained by mixing main components, i.e., natural pulp represented by chemical pulp such as LBKP and NBKP, mechanical pulp such as GP, PGW, RMP, TMP, CTMP, CMP and CGP, and waste paper pulp such as DIP, and a conventionally known pigment, with at least one of various additives such as a binder, a sizing agent, a fixing agent, a retention aid, a cationizing agent and a strength agent;
b) base papers which have been size-pressed with starch or polyvinyl alcohol or have an anchor coat layer thereon, and coated papers having a coating layer provided on such base papers such as art paper, coated paper and cast coated paper;
c) base papers which have been smoothed by a calendering machine such as a machine calender, TG calender and a soft calender;
d) resin coated papers obtained by coating each or either side of base paper or coated paper with high density or low density polyethylene, polypropylene or polyester;
e) synthetic resin films of polyethylene terephthalate, polypropylene, polyethylene, polyester, polycarbonate, norbornene, vinylon, polyvinyl alcohol or nylon and translucent synthetic resin films obtained by incorporating a pigment, a blowing agent or the like into these materials to lower the transparency;
f) synthetic papers obtained by stretching and laminating a mixture of a thermoplastic resin such as polyethylene, polypropylene, ethylene/propylene copolymer, ethylene/vinyl acetate copolymer, polystyrene and acrylate polymer and copolymer with an inorganic pigment such as calcium carbonate, talc, silica or calcined clay; and
g) those supports having a surface which has been improved in adhesiveness by corona discharge treatment, flame treatment, plasma treatment or anchor coating, may be preferably used.

However, when the support is an acidic base paper obtained by sheeting a slurry containing natural pulp as the main component or a pseudo acidic base paper obtained by coating a neutral paper with a aluminum sulfate solution by a tab size press, a shim sizer, an air knife coater, a blade coater, a gate roll coater, a bar coater, a rod coater, a roll coater, a bill blade coater or a short dwell coater, an ink jet recording sheet more improved against yellowing under a blank state is obtained. When a so-called neutral paper, which containing natural pulp as the main component and heavy calcium carbonate or light calcium carbonate as a filler, is used as the support of an ink jet recording sheet, the surface pH of the ink receiving layer shifts to the alkali region as time passes, because the solid alkali as the filler governs the total pH of the ink jet recording sheet inclusive of that of the ink receiving layer. Therefore, use of an acidic base paper or a pseudo acidic base paper is a preferable mode.

Further, these supports may be subjected to calendering through a machine calender, a super calender, a gloss calender, a matte calender, a friction calender or a brush calender. A support having a basis weight of about from 50 to 300 g/m$^2$ is usually used.

The coating amount of the ink receiving layer is not particularly limited, but it is usually from 1 to 50 g/m$^2$, preferably from 1 to 12 g/m$^2$, more preferably from 1 to 7 g/m$^2$ on a dry solid basis. If the coating amount is less than 1 g/m$^2$, the print density and ink absorptivity unfavorably become inadequate. If the coating amount exceeds 50 g/m$^2$, the curing property of an ink jet recording sheet unfavorably becomes poor.

In the present invention, an ink receiving layer is formed on a support on machine or off machine by using water, a hydrophilic organic solvent or their mixture, or an organic solvent, by various conventionally known apparatus such as an air knife coater, a curtain coater, a die coater, a lip coater, a blade coater, a gate roll coater, a bar coater, a rod coater, a roll coater, a bill blade coater, a short dwell blade coater, a size press and a film transfer coater. Above all, on machine coaters such as a gate roll coater and a film transfer coater are preferably used for coating.

It is possible to form a predetermined amount of an ink receiving layer dividedly by forming and drying layers one after another or by simultaneously forming more than one layer wet on wet.

Formation of an ink receiving layer may be followed by smoothing with a calendering machine such as a machine calender, a TG calender, a super calender and a soft calender.

The ink jet recording sheet of the present invention may have a back coat which imparts curling applicability behind the support opposite to the ink receiving layer. As the pigment for a back coat, a planar pigment or hydrolyzed halloysite is preferable. Curling can be remedied even without a back coat, by a steam jet from a humidifier such as a fluedex.

In the present invention, conventionally known inks are suitably used for ink jet recording. Water-based inks using the following coloring materials are usually used in view of brightness of images and the safety of inks themselves.

For example, direct dyes such as C.I. Direct Yellow 12, C.I. Direct Yellow 24, C.I. Direct Yellow 26, C.I. Direct Yellow 44, C.I. Direct Yellow 86, C.I. Direct Yellow 98, C.I. Direct Yellow 100, C.I. Direct Yellow 142, C.I. Direct red 1, C.I. Direct red 4, C.I. Direct red 17, C.I. Direct red 28, C.I. Direct red 83, C.I. Direct Orange 34, C.I. Direct Orange 39, C.I. Direct Orange 44, C.I. Direct Orange 46, C.I. Direct Orange 60, C.I. Direct Violet 47, C.I. Direct Violet 48, C.I. Direct Blue 6, C.I. Direct Blue 22, C.I. Direct Blue 25, C.I. Direct Blue 71, C.I. Direct Blue 86, C.I. Direct Blue 90, C.I. Direct Blue 106, C.I. Direct Blue 199, C.I. Direct Black 17, C.I. Direct Black 19, C.I. Direct Black 32, C.I. Direct Black 51, C.I. Direct Black 62, C.I. Direct Black 71, C.I. Direct Black 108, C.I. Direct Black 146 and C.I. Direct Black 154 and acid dyes such as C.I. Acid Yellow 11, C.I. Acid Yellow 17, C.I. Acid Yellow 23, C.I. Acid Yellow 25, C.I. Acid Yellow 29, C.I. Acid Yellow 42, C.I. Acid Yellow 49, C.I. Acid Yellow 61, C.I. Acid Yellow 71, C.I. Acid red 1, C.I. Acid red 6, C.I. Acid red 8, C.I. Acid red 32, C.I. Acid red 37, C.I. Acid red 51, C.I. Acid red 52, C.I. Acid red 80, C.1. Acid red 85, C.I. Acid red 87, C.I. Acid red 92, C.I. Acid red 94, C.I. Acid red 115, C.I. Acid red 180, C.I. Acid red 256, C.I. Acid red 317, C.I. Acid red 315, C.I. Acid Orange 7, C.I. Acid Orange 19, C.I. Acid Violet 49, C.I. Acid Blue 9, C.I. Acid Blue 22, C.I. Acid Blue 40, C.I. Acid Blue 59, C.I. Acid Blue 93, C.I. Acid Blue 102, C.I. Acid Blue 104, C.I. Acid Blue 113, C.I. Acid Blue 117, C.I. Acid Blue 120, C.I. Acid Blue 167, C.I. Acid Blue 229, C.I. Acid Blue 234, C.I. Acid Blue 254, C.I. Acid Black 2, C.I. Acid Black 7, C.I. Acid Black 24, C.I. Acid Black 26, C.I. Acid Black 31, C.I. Acid Black 52, C.I. Acid Black 63, C.I. Acid Black 112 and C.I. Acid Black 118 as well as basic dyes, reactive dyes and food colors may be mentioned.

On the other hand, inks using pigments as coloring materials proposed, for example, in JP-A-57-10660, JP-A-57-10661, JP-A-4-234467, JP-A-5-156189, JP-A-5-179183, JP-A-5-202324, JP-A-5-263029, JP-A-5-331397, JP-A-6-122846 and JP-A-6-136311 can also be suitably used for ink jet recording.

Further, oil-based inks using oil-soluble dyes as coloring materials proposed, for example, in JP-B-7-78187, JP-B-7-78188, JP-B-8-6057, JP-B-8-26259, JP-B-6-247034 and JP-B-6-306319 can also be suitably used for ink jet recording.

Now, the present invention will be described in further detail with reference to Examples. However, it should be understood that the present invention is by no means restricted to such specific Examples. In the Examples, "parts" and "%" mean parts by weight and wt %, unless otherwise noted.

Preparation of Synthetic Amorphous Silica (a)

9 $m^3$ of sodium silicate (molar ratio of $SiO_2/Na_2O$: 3.1, $SiO_2$ concentration: 26.9%), 11.5 $m^3$ of $Na_2SO_4$ ($Na_2O$ concentration: 2.15%) and 29 $m^3$ of water were loaded into a reaction vessel, and 1.36 $m^3$ of 45% sulfuric acid was gradually added over 10 minutes with stirring. The temperature was raised gradually to 90° C. over 30 minutes and maintained at 90° C. for 10 minutes for aging.

The resulting silica sol solution was further neutralized by gradually adding about 1.42 $m^3$ of sulfuric acid over 90 minutes so as to finally fall within the pH range of from 2.5 to 3.5, and the reaction was terminated.

The acidic silica hydrosol was powdered by means of a spray dryer after filtered and washed with water. The resulting powder was pulverized with a jet atomizer to give synthetic amorphous silica (a) with physical properties such as V1 of 0.16 ml/g, V2 of 0.8 ml/g, a peak pore size of 68 Å, an average particle diameter of 4 μm and a specific surface of 212 $m^2/g$. The pore volumes, peak pore size and specific surface were measured by means of a nitrogen adsorber according to a BET method, the particle diameter was measured by means of a coulter counter type particle size analyzer using a 50 μm-wide aperture.

Preparation of Synthetic Amorphous Silicas (b) to (j)

Figure 2:
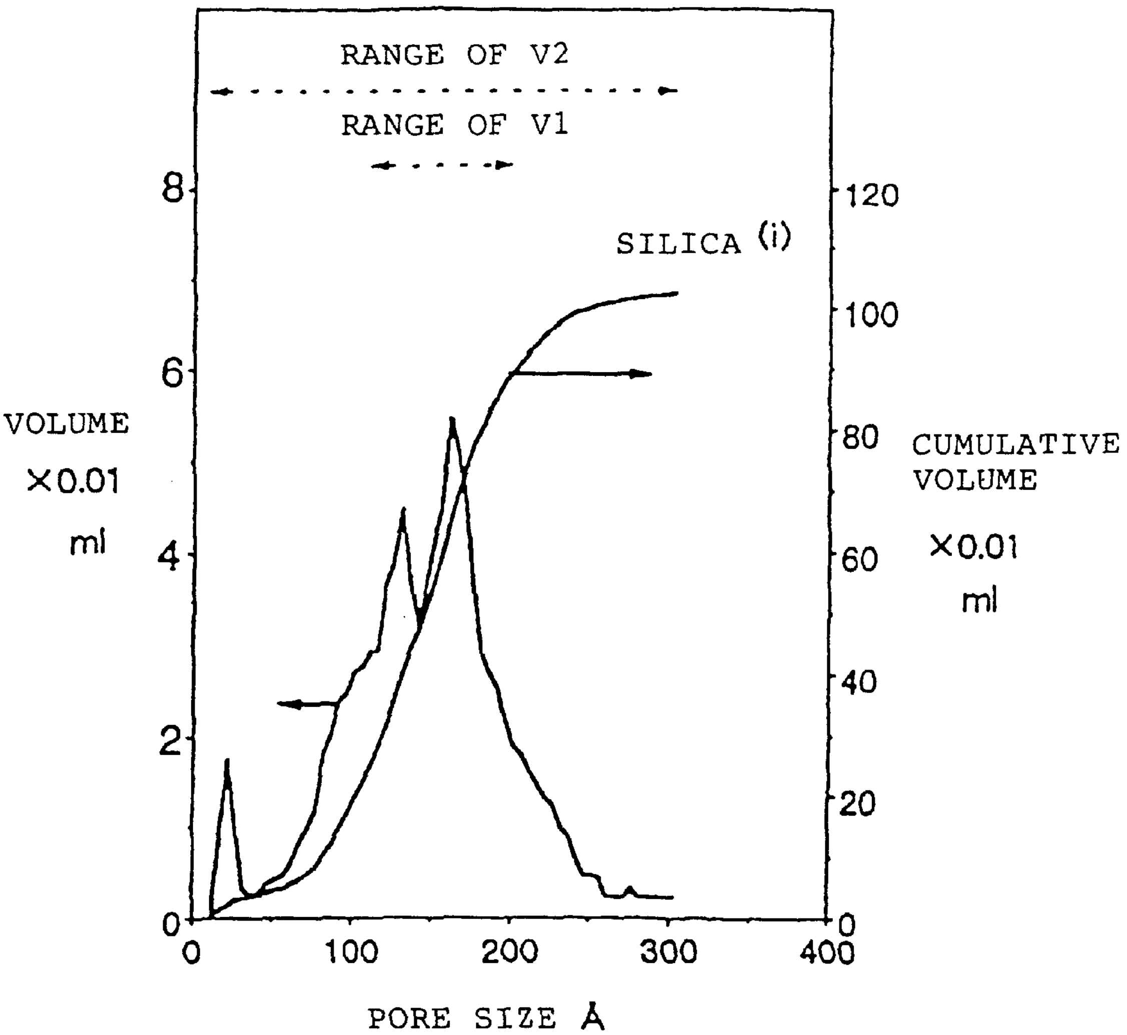
FIG. 2 illustrates the pore size distribution of synthetic amorphous silica (i) used in Comparative Example to cause terrible yellowing.

Synthetic amorphous silicas (b) to (j) having the pore volumes and peak pore sizes shown in Table 1 were prepared by wet methods similar to that in Preparation Example a while the temperature and time for temperature rise during the reaction of sodium silicate and sulfuric acid and the aging temperature and time were appropriately changed. The pore distributions of synthetic amorphous silicas (b) and (i) are graphically shown in FIGS. 1 and 2, respectively. Synthetic amorphous silica (b) with V1 of 0.17 ml/g and V2 of 1.03 ml/g (a peak pore size of 75 Å) is synthetic amorphous silica preferably for use in ink jet recording sheets, while synthetic amorphous silica (i) shows an unfavorable pore distribution with V1 as large as 0.62 ml/g (a peak pore size of 162 Å).

TABLE 1

| Synthetic amorphous silica | V1 (ml/g) | V2 (ml/g) | Peak pore size (Å) | Average particle diameter (μm) | specific surface ($m^2/g$) |
|---|---|---|---|---|---|
| a | 0.16 | 0.80 | 68 | 4.0 | 212 |
| b | 0.17 | 1.03 | 75 | 4.1 | 220 |
| c | 0.50 | 1.82 | 230 | 3.5 | 255 |
| d | 0.12 | 1.20 | 101 | 4.3 | 205 |
| e | 0.05 | 1.20 | 93 | 3.7 | 196 |
| f | 0.18 | 1.41 | 240 | 5.1 | 190 |
| g | 0.09 | 0.60 | 75 | 4.0 | 180 |
| h | 0.55 | 1.05 | 83 | 4.5 | 210 |
| i | 0.62 | 1.02 | 162 | 3.8 | 221 |
| j | 0.63 | 0.75 | 120 | 3.9 | 187 |

Yellowing Under a Blank State

A square window of 5 cm×5 cm was cut at the center in one side of a plastic filing bag (A4 size) made of polypropylene containing 1.0 wt % of BHT, and $L^*a^*b^*$(CIE1976)

of the ink receiving layer of an ink jet recording sheet was measured with a Minolta CR-100 color difference meter before and after the ink jet recording sheet was kept in the filing bag in an environment at 20° C. and 65% RH for 4 months with the surface of the ink receiving layer facing the window. The degree of yellowing is expressed as the change in $b^*$ ($\Delta b^*$), and a smaller value indicates less yellowing.

Ink Absorptivity

Black and yellow solid printing was done by means of Canon BJC400J to make a neighboring yellow and black rectangular solid images of 2×10 cm touching each other so that an ink jet recording sheet with poor ink absorptivity would give a blurred boundary due to mixing of black and yellow. Visual evaluation was done as follows.

○: No blurring was observed.

Δ: The boundary was partly blurred.

X: The boundary was awfully blurred, and the edges of the image of each color were also terribly blurred.

Examples and Comparative Examples of the ink jet recording sheet of the present invention are given below.

EXAMPLE 1

100 Parts of wood pulp comprising 90 parts of LBKP (freeness 380 mlcsf) and 10 parts of NBKP (freeness 480 mlcsf) was mixed with 20 parts of a pigment comprising light calcium carbonate and heavy calcium carbonate in a ratio of 1:1, 0.10 part of a commercially available alkyl ketene dimer, 0.03 part of a commercially available cationic polyacrylamide, 1.0 part of a commercially available cationized starch and 0.5 part of aluminum sulfate, and sheeted by a Fourdrinier paper machine to give a neutral base paper with a basis weight of 120 g/m$^2$.

The neutral base paper was coated with a coating solution for an ink receiving layer having the following composition (pH 6.1) on a dry basis of 7 g/m$^2$ by means of a rod bar, then dried and calendered to give an ink jet recording sheet of Example 1. The surface pH of the ink jet recording sheet of Example 1 defined in TAPPI T529 was 7.0 when measured after 3 days of moisture conditioning at 20° C. and 65% RH.

Composition of the Coating Solution for an Ink Receiving Layer

| | |
|---|---|
| Synthetic amorphous silica (a) | 100 parts |
| PVA (PVA 117, Kuraray Co., Ltd., 10% aqueous solution) | 300 parts |
| Cationic fixing agent (Sumirez Resin 1001, Sumitomo Chemical Company, Limited, 30% aqueous solution) | 50 parts |
| Water | 350 parts |

EXAMPLES 2 to 6

Ink jet recording sheets of Examples 2 to 6 were prepared in the same manner as in Example 1 except that the synthetic amorphous silica in the coating solution for an ink receiving layer was changed to synthetic amorphous silicas (b) to (f) as shown in Table 1, respectively.

EXAMPLES 7 and 8

Ink jet recording sheets of Examples 7 and 8 were prepared in the same manner as in Example 1 except that the coating solution for an ink receiving layer was appropriately adjusted to pH 5.0 and 4.3, respectively, with 0.1% aqueous sulfuric acid.

EXAMPLES 9 and 10

100 Parts of wood pulp comprising 90 parts of LBKP (freeness 380 mlcsf) and 10 parts of NBKP (freeness 480 mlcsf) was mixed with 20 parts of talc, 0.2 part of a commercially available rosin size and 0.3 part of a commercially available cationized starch, and sheeted by a Fourdrinier paper machine to give an acidic base paper with a basis weight of 120 g/m$^2$. Ink jet recording sheets of Examples 9 and 10 were prepared in the same manner as in Examples 1 and 2 except that the acidic base paper was used as the supports.

EXAMPLES 11 and 12

Both sides of the same neutral base paper as used in Example 1 were coated with 10% aluminum sulfate aqueous solution by means of a rod bar on a dry basis of 1 g/m$^2$ to give a pseudo acidic base paper. Ink jet recording sheets of Examples 11 and 12 were prepared in the same manner as in Examples 1 and 2 except that the pseudo acidic base paper was used as the supports.

EXAMPLES 13 to 19

The same acidic base paper as used in Examples 9 and 10 was coated with a coating solution for an ink receiving layer with the following composition (pH 6.2) by means of a film transfer coater on dry bases of 0.5 g/m$^2$ (Example 13), 1.0 g/m$^2$ (Example 14), 3.0 g/m$^2$ (Example 15), 5.0 g/m$^2$ (Example 16), 7.0 g/m$^2$ (Example 17), 9.0 g/m$^2$ (Example 18) and 12.0 g/m$^2$ (Example 19), then dried and calendered to give ink jet recording sheets of Examples 13 to 19, respectively.

Composition of the Coating Solution for an Ink Receiving Layer

| | |
|---|---|
| Synthetic amorphous silica (a) | 100 parts |
| PVA (PVA 117, Kuraray Co., Ltd., 10% aqueous solution) | 300 parts |
| Cationic fixing agent (Sumirez Resin 1001, Sumitomo Chemical Company, Ltd., 30% aqueous solution) | 50 parts |
| Fluidity-improving agent (SN-Thickener, San Nopco Limited, 30% dispersion) | 3 parts |
| Water | 350 parts |

EXAMPLES 20 to 23

The same acidic base paper as used in Examples 9 and 10 was coated with the coating solution for an ink receiving layer used in Examples 13 to 19 (pH) by means of a rod bar on dry bases of 9.0 g/m$^2$ (Example 20), 12.0 g/m$^2$ (Example 21), 15.0 g/m$^2$ (Example 22) and 20.0 g/m$^2$ (Example 23), then dried and calendered to give ink jet recording sheets of Examples 20 to 23, respectively.

EXAMPLE 24

The surface and back of the same acidic base paper as used in Examples 9 and 10 were coated with the coating solution for an ink receiving layer used in Examples 13 to 19 by means of a film transfer coater on dry bases of 4.5 g/m$^2$ and 5.5 g/m$^2$, respectively, then dried and calendered to give a double-coated ink jet recording sheet of Example 24.

EXAMPLE 25

An ink jet recording sheet of Example 25 was prepared in the same manner as in Example 24 except that the same neutral base paper as used in Example 1 was used.

EXAMPLE 26

An ink jet recording sheet of Example 26 was prepared in the same manner as in Example 24 except that the same pseudo acidic base paper as used in Examples 11 and 12 was used.

COMPARATIVE EXAMPLES 1 to 4

Ink jet recording sheets of Comparative Examples 1 to 4 were prepared in the same manner as in Example 1 except that the synthetic amorphous silica in the coating solution for an ink receiving layer was changed to synthetic amorphous silicas (g) to (j) as shown in Table 1, respectively.

The results of evaluation of the ink jet recording sheets thus obtained in Examples 1 to 26 and Comparative Examples 1 to 4 are tabulated in Tables 2 and 3.

TABLE 2

| Example or Comparative Example | Synthetic amorphous silica | Surface pH of ink receiving layer (pH) | Support | Yellowing (Δb*) | Ink absorptivity |
|---|---|---|---|---|---|
| Example 1 | a | 7.0 | Neutral paper | 2.6 | ○ |
| Example 2 | b | 7.0 | Neutral paper | 2.4 | ○ |
| Example 3 | c | 7.1 | Neutral paper | 2.6 | ○ |
| Example 4 | d | 7.0 | Neutral paper | 2.3 | ○ |
| Example 5 | e | 7.1 | Neutral paper | 1.7 | ○ |
| Example 6 | f | 6.9 | Neutral paper | 1.8 | ○ |
| Example 7 | a | 6.0 | Neutral paper | 1.3 | ○ |
| Example 8 | a | 5.6 | Neutral paper | 0.5 | ○ |
| Example 9 | a | 5.7 | Acidic paper | 0.3 | ○ |
| Example 10 | b | 5.5 | Acidic paper | 0.3 | ○ |
| Example 11 | a | 6.0 | Pseudo acidic paper | 0.4 | ○ |
| Example 12 | b | 5.8 | Pseudo acidic paper | 0.3 | ○ |
| Comparative Example 1 | g | 6.9 | Neutral paper | 2.5 | X |
| Comparative Example 2 | h | 7.0 | Neutral paper | 4.1 | ○ |
| Comparative Example 3 | i | 6.8 | Neutral paper | 9.9 | ○ |
| Comparative Example 4 | j | 6.8 | Neutral paper | 9.8 | Δ |

TABLE 3

| Example | Synthetic amorphous silica | Coating amount ($g/m^2$) | Surface pH of ink receiving layer | Support | Yellowing Δb* | Ink absorptivity |
|---|---|---|---|---|---|---|
| 13 | a | 0.5 | 5.6 | Acidic paper | 0.2 | Δ |
| 14 | a | 1.0 | 5.6 | Acidic paper | 0.3 | ○ |
| 15 | a | 3.0 | 5.6 | Acidic paper | 0.3 | ○ |

TABLE 3-continued

| Example | Synthetic amorphous silica | Coating amount ($g/m^2$) | Surface pH of ink receiving layer | Support | Yellowing Δb* | Ink absorptivity |
|---|---|---|---|---|---|---|
| 16 | a | 5.0 | 5.7 | Acidic paper | 0.3 | ○ |
| 17 | a | 7.0 | 5.7 | Acidic paper | 0.3 | ○ |
| 18 | a | 9.0 | 5.8 | Acidic paper | 0.5 | ○ |
| 19 | a | 12.0 | 5.8 | Acidic paper | 0.9 | ○ |
| 20 | a | 9.0 | 5.8 | Acidic paper | 0.6 | ○ |
| 21 | a | 12.0 | 5.9 | Acidic paper | 0.9 | ○ |
| 22 | a | 15.0 | 5.9 | Acidic paper | 1.5 | ○ |
| 23 | a | 20.0 | 6.0 | Acidic paper | 2.1 | ○ |
| 24 | a | 4.5/5.5 | 5.6/5.7 | Acidic paper | 0.3/0.3 | ○ |
| 25 | a | 4.5/5.5 | 7.0/6.9 | Neutral paper | 2.5/2.5 | ○ |
| 26 | a | 4.5/5.5 | 6.0/6.0 | Pseudo acidic paper | 0.4/0/4 | ○ |

Evaluation

The ink jet recording sheets of Examples 1 to 12 according to the present invention were improved against yellowing under a blank state and were excellent in ink absorptivity, as shown in Table 2. Especially, in Examples 7 to 12, yellowing under a blank state was suppressed further as the surface pH of the ink receiving layers were below 6.0. As is evident from Table 3, when the coating amount was within a range of from 1 to 7 $g/m^2$ yellowing under a blank state hardly occurred, and more stable ink jet recording sheets improved against yellowing under a blank state and excellent in ink absorptivity were obtained.

On the contrary, in Comparative Example 1, although improvement against yellowing under a blank state was achieved because the pore volume V1 of pores within the range of from 110 to 200 Å was less than 0.5 ml/g, the ink absorptivity was poor because the pore volume V2 of pores within the range of from 10 to 300 Å was small. On the other hand, in Comparative Examples 2 and 3, V1 was too large to suppress yellowing under a blank state. In Comparative Example 4, yellowing under a blank state was terrible, and the ink absorptivity was poor, because pores within the range of from 110 to 200 Å accounted for most of the pore volume, and the pore volume V2 of pores within the range of from 10 to 300 Å was too small.

The ink jet recording system can now provide highly fine and high-quality images at low cost by virtue of improvement of printers and plotters and is expected to spread widely as a substitute for silver salt photography. Therefore, stable long-term storability is pretty crucial for ink jet recording sheets. According to the present invention, an ink jet recording sheet improved against yellowing under a blank state and excellent in ink absorptivity can be obtained.

What is claimed is:

1. An ink jet recording sheet having an ink receiving layer containing synthetic amorphous silica formed on at least one side of a support, wherein the pore volume (V1:ml/g) of pores with pore sizes of from 110 to 200 Å and the pore volume (V2:ml/g) of pores with pore sizes of from 10 to 300 Å in the synthetic amorphous silica satisfy the following mathematical formulae 1 and 2.

$$V1 \leqq 0.5\ (ml/g) \quad 1$$

$$V2 \geqq 0.8\ (ml/g) \quad 2.$$

2. The ink jet recording sheet according to claim 1, wherein the surface pH of the ink receiving layer defined in TAPPI T529 is at most 6.0.

3. The ink jet recording sheet according to claim 2, wherein the support is an acidic base paper obtained by sheeting a slurry containing natural pulp as a main component.

4. The ink jet recording sheet according to claim 2, wherein the support is a pseudo acidic base paper obtained by coating a neutral paper obtained by sheeting a slurry containing natural pulp as a main component, with an aluminum sulfate solution.

5. The ink jet recording sheet according to any one of claims 1 to 4 wherein the coating amount of the ink receiving layer is within a range of from 1 to 7 g/m$^2$ .

6. The ink jet recording sheet according to claim 1, which has an ink receiving layers formed by an on machine coater on each side of the support.

7. The ink jet recording sheet according to claim 5, wherein the ink receiving layer is formed by a film transfer method.

8. The ink jet recording sheet according to claim 6, wherein the ink receiving layer is formed by a film transfer method.

* * * * *